United States Patent
Zhao et al.

(10) Patent No.: US 12,410,834 B2
(45) Date of Patent: Sep. 9, 2025

(54) LINEAR MOTION GUIDE APPARATUS

(71) Applicant: THK CO., LTD., Tokyo (JP)

(72) Inventors: Bin Zhao, Tokyo (JP); Nobuyuki Ikegami, Tokyo (JP)

(73) Assignee: THK CO., LTD., Tokyo (JP)

( * ) Notice: Subject to any disclaimer, the term of this patent is extended or adjusted under 35 U.S.C. 154(b) by 121 days.

(21) Appl. No.: 18/263,298

(22) PCT Filed: Nov. 5, 2021

(86) PCT No.: PCT/JP2021/040692
§ 371 (c)(1),
(2) Date: Jul. 27, 2023

(87) PCT Pub. No.: WO2022/163051
PCT Pub. Date: Aug. 4, 2022

(65) Prior Publication Data
US 2024/0125352 A1    Apr. 18, 2024

(30) Foreign Application Priority Data
Jan. 29, 2021  (JP) .................. 2021-012649

(51) Int. Cl.
*F16C 33/30* (2006.01)
*F16C 29/00* (2006.01)
(Continued)

(52) U.S. Cl.
CPC .......... *F16C 33/306* (2013.01); *F16C 29/005* (2013.01); *F16C 29/041* (2013.01); *F16C 33/46* (2013.01)

(58) Field of Classification Search
CPC ...... F16C 29/04; F16C 29/041; F16C 29/043; F16C 29/045; F16C 29/046; F16C 29/048; F16C 33/306
See application file for complete search history.

(56) References Cited

U.S. PATENT DOCUMENTS

| 2003/0108256 A1* | 6/2003 | Kamimura | F16C 33/306 384/51 |
| 2005/0117821 A1* | 6/2005 | Yamazaki | F16C 33/306 384/51 |
| 2016/0319865 A1* | 11/2016 | Nara | F16C 33/306 |

FOREIGN PATENT DOCUMENTS

| EP | 2423143 A2 | 2/2012 |
| JP | S62179423 U | 11/1987 |

(Continued)

OTHER PUBLICATIONS

Machine Translation of JP 2003-262224 (Year: 2003).*
(Continued)

*Primary Examiner* — Alan B Waits
(74) *Attorney, Agent, or Firm* — NIXON & VANDERHYE

(57) ABSTRACT

A linear motion guide apparatus in which a guide rail can be readily provided with a meshing portion that meshes with a gear is provided. The linear motion guide apparatus includes: two guide rails that are movable relative to each other in a longitudinal direction thereof via at least one rolling element; and a cage configured to hold the rolling element and rotatably hold a gear engaging with a meshing portion provided to at least one of the two guide rails. The meshing portion includes a plurality of circular holes arranged in the longitudinal direction on the guide rail. Each of the circular holes has a wall surface formed in a cylindrical shape.

12 Claims, 9 Drawing Sheets

(51) Int. Cl.
 *F16C 29/04* (2006.01)
 *F16C 33/46* (2006.01)

(56) References Cited

FOREIGN PATENT DOCUMENTS

| | | |
|---|---|---|
| JP | 2003176820 A | 6/2003 |
| JP | 2003262224 A | 9/2003 |
| JP | 2006183821 A | 7/2006 |
| JP | 2007232062 A | 9/2007 |

OTHER PUBLICATIONS

Extended European Search Report, issued in European Patent Application No. 21923056.2 dated Nov. 5, 2024.
International Search Report w/English translation for PCT/JP2021/040692 mailed Jan. 25, 2022, 5 pages.
Written Opinion of the ISA for PCT/JP2021/040692 mailed Jan. 25, 2022, 4 pages.

\* cited by examiner

LINEAR MOTION GUIDE APPARATUS

CROSS-REFERENCE TO RELATED APPLICATIONS

This application is the U.S. national phase of International Application No. PCT/JP2021/040692 filed Nov. 5, 2021, which designated the U.S. and claims priority to JP 2021-012649 filed Jan. 29, 2021, the entire contents of each of which are hereby incorporated by reference.

TECHNICAL FIELD

The present invention relates to a linear motion guide apparatus including a mechanism that controls positional displacement of a cage.

BACKGROUND ART

A linear motion guide apparatus including a positional displacement control mechanism that controls positional displacement of a cage is known (refer to Patent Literature 1). The linear motion guide apparatus includes two guide rails that can move relative to each other in a longitudinal direction thereof via at least one rolling element. The rolling element is held by a cage.

When the two guide rails are repeatedly moved relative to each other in the linear motion guide apparatus, the cage that holds the rolling element is displaced from the normal position. The positional displacement control mechanism is provided to control positional displacement of the cage. The positional displacement control mechanism includes racks provided to the guide rails, and a pinion provided to the cage. When the two guide rails move relative to each other, the pinion moves in the normal position while meshing with the racks. Hence, it is possible to control positional displacement of the cage.

In the linear motion guide apparatus described in Patent Literature 1, the racks and the pinion are formed as involute gears that are ideal gears. Consequently, the strength of the racks and the pinion can be secured.

CITATION LIST

Patent Literature

Patent Literature 1: JP S62-179423 U

SUMMARY OF INVENTION

Technical Problem

However, the involute gears have a complicated shape, and there is a problem that it takes great time and effort to provide the guide rails with the involute gears.

The present invention has been made in view of the above problem, and an object thereof is to provide a linear motion guide apparatus in which a guide rail can be readily provided with a meshing portion that engages with a gear.

Solution to Problem

In order to solve the above problem, one aspect of the present invention is a linear motion guide apparatus including: two guide rails that are movable relative to each other in a longitudinal direction thereof via at least one rolling element; and a cage configured to hold the rolling element and rotatably hold a gear engaging with a meshing portion provided to at least one of the two guide rails, in which the meshing portion includes a plurality of circular holes arranged in the longitudinal direction on the guide rail, and each of the circular holes has a wall surface formed in a cylindrical shape.

Advantageous Effects of Invention

According to the present invention, the meshing portion that engages with the gear is formed as the plurality of circular holes. Therefore, the meshing portion can be easily provided to the guide rail.

DESCRIPTION OF EMBODIMENTS

Embodiments of a linear motion guide apparatus of the present invention are described hereinafter with reference to the accompanying drawings. However, the linear motion guide apparatus of the present invention can be embodied in various forms and is not limited to the embodiments described in the description. The embodiments are provided with the intention of enabling those skilled in the art to fully understand the invention by fully disclosing the description.

Figure 1:
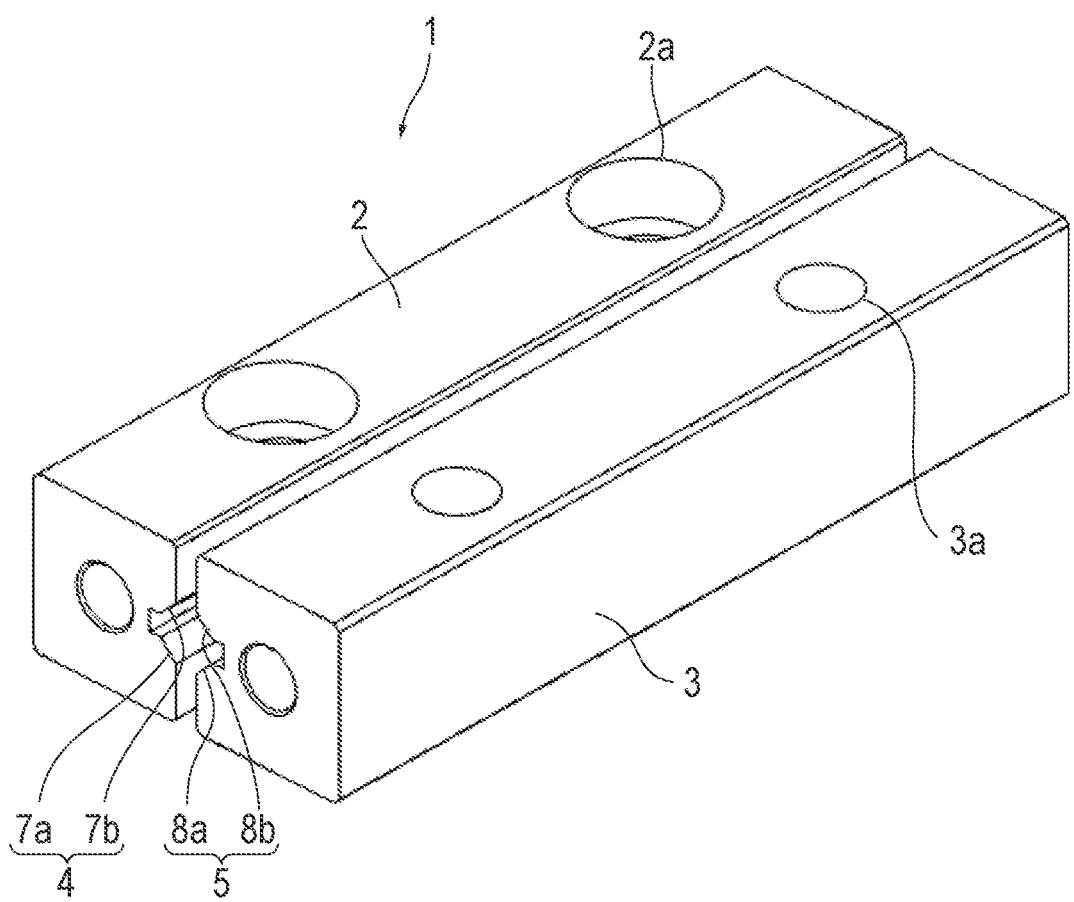
FIG. 1 is a perspective view of a linear motion guide apparatus of one embodiment of the present invention.

FIG. 1 is a perspective view of a linear motion guide apparatus 1 of one embodiment of the present invention. Reference signs 2 and 3 denote guide rails. Raceway grooves 4 and 5 having a V shape in cross section are formed in the guide rails 2 and 3, respectively. The raceway groove 4 includes raceway surfaces 7a and 7b perpendicular to each other. The raceway groove 5 includes raceway surfaces 8a and 8b perpendicular to each other. The guide rails 2 and 3 can move relative to each other in a longitudinal direction thereof via rollers 9a and 9b (refer to FIG. 2).

A mounting hole 2a for mounting on, for example, a base is formed in the guide rail 2. A mounting hole 3a for mounting on, for example, a table is formed in the guide rail 3. The shape of the guide rail 3 is substantially the same as a shape of the guide rail 2 flipped 180°.

Figure 2:
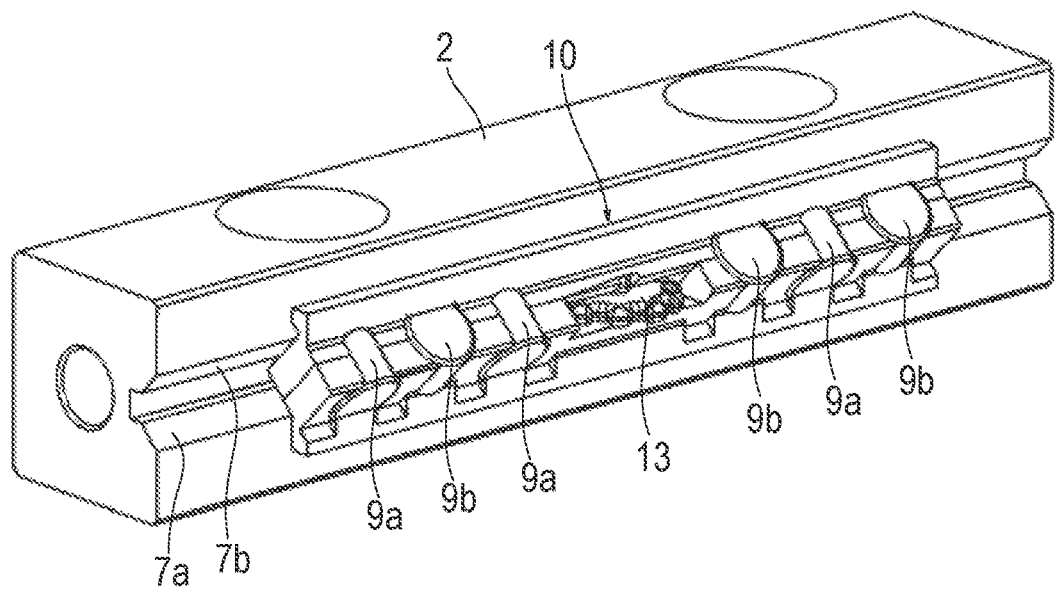
FIG. 2 is an internal structural drawing of the linear motion guide apparatus of the embodiment.
Figure 3:
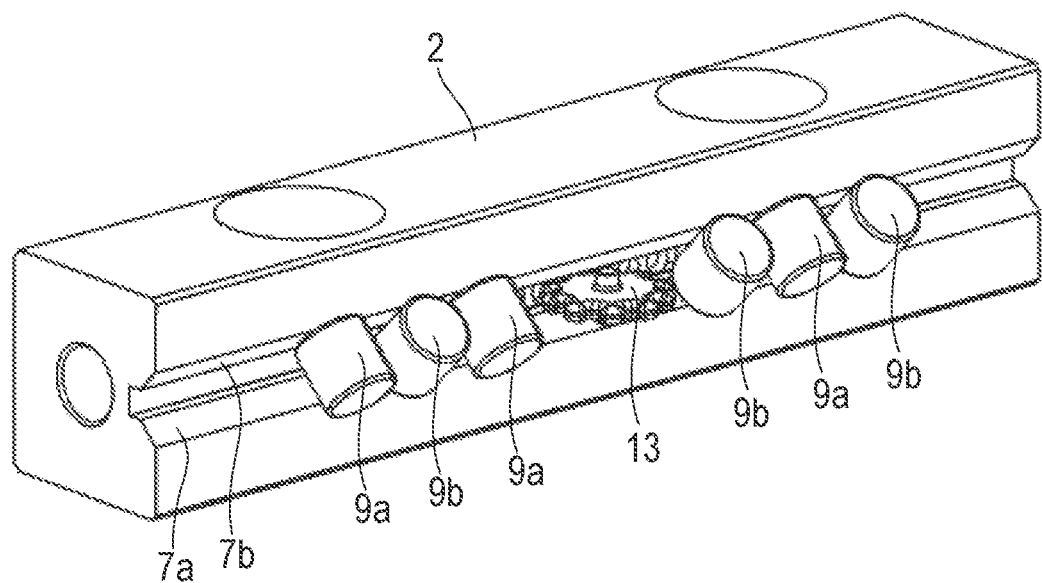
FIG. 3 is a perspective view illustrating rolling elements and a gear of the linear motion guide apparatus of the embodiment.

FIG. 2 illustrates a state in which the guide rail 3 on the front side in FIG. 1 is omitted. FIG. 3 illustrates a state in which a cage 10 of FIG. 2 is omitted. The rollers 9a and 9b as rolling elements are placed between the opposing raceway grooves 4 and 5 of the guide rails 2 and 3. The rollers 9a and 9b serve as a crossed roller having the adjacent rollers 9a and 9b whose axes are perpendicular to each other. In side view, the rollers 9a and 9b have an approximately square shape, and the diameter of the rollers 9a and 9b is slightly greater than the length of the rollers 9a and 9b in the axial direction. The side surface of the roller 9a is in contact with the raceway surface 7a of the guide rail 2 and the raceway surface 8b of the guide rail 3. The side surface of the roller 9b is in contact with the raceway surface 7b of the guide rail 2 and the raceway surface 8a of the guide rail 3. A force acting on the guide rail 2 is transmitted to the guide rail 3 via the rollers 9a and 9b.

Note that in the embodiment, a crossed roller is used as the rolling element. However, a ball may be used as the rolling element, or a parallel roller such as a needle roller may be used as the rolling element.

As illustrated in FIG. 2, the rollers 9a and 9b are held by the cage 10 extending in the longitudinal direction along the guide rails 2 and 3. A pinion-like gear 13 is also rotatably held by the cage 10. The gear 13 is placed substantially in the middle of the cage 10 in a length direction thereof.

Figure 4:
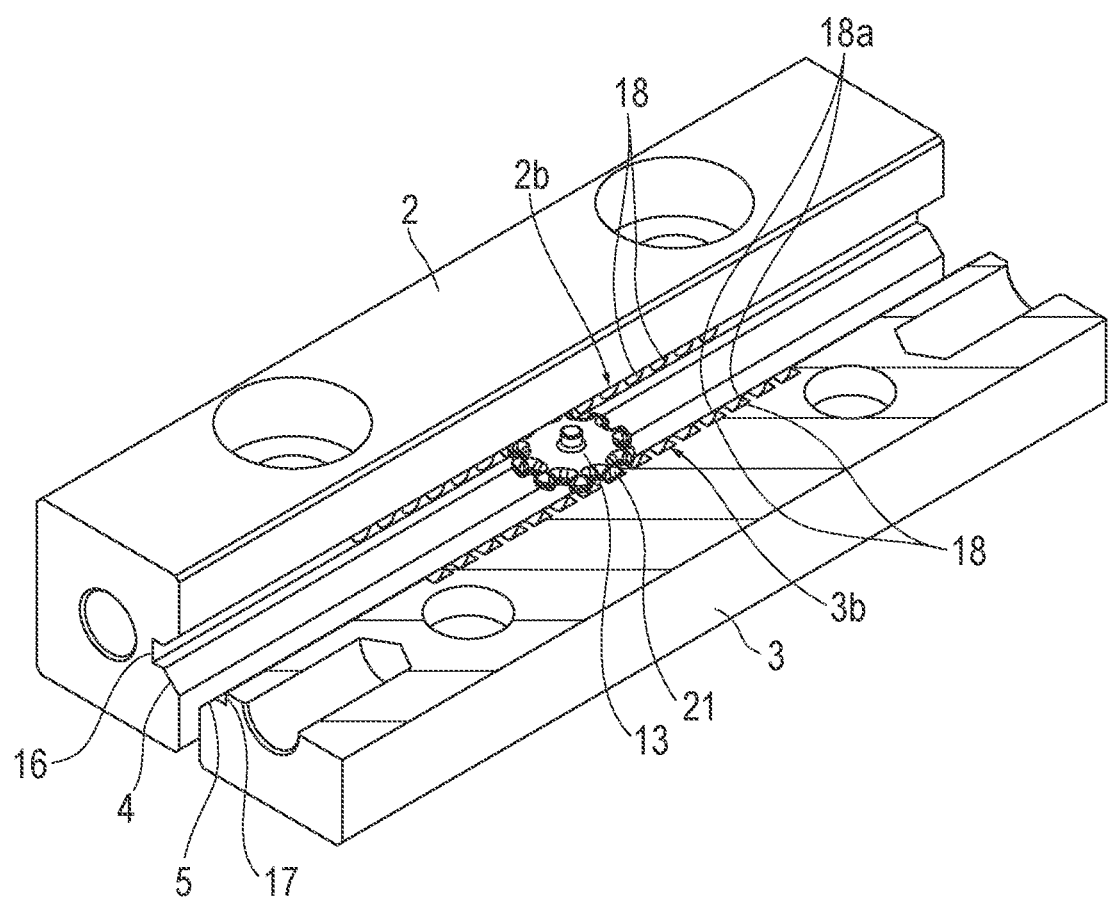
FIG. 4 is a perspective view illustrating guide rails and the gear of the linear motion guide apparatus of the embodiment (the perspective view partially including a cross-sectional view of the guide rail).

FIG. 4 illustrates the guide rails 2 and 3 and the gear 13. Undercuts 16 and 17 are formed in the bottoms of the raceway grooves 4 and 5 of the guide rails 2 and 3. Rack-like meshing portions 2b and 3b are formed in the bottom surfaces of the undercuts 16 and 17. Teeth 21 of the gear 13 engage with the meshing portions 2b and 3b. The position of the gear 13 relative to the guide rails 2 and 3 is determined by the relative positions of the guide rails 2 and 3.

Figure 5A:
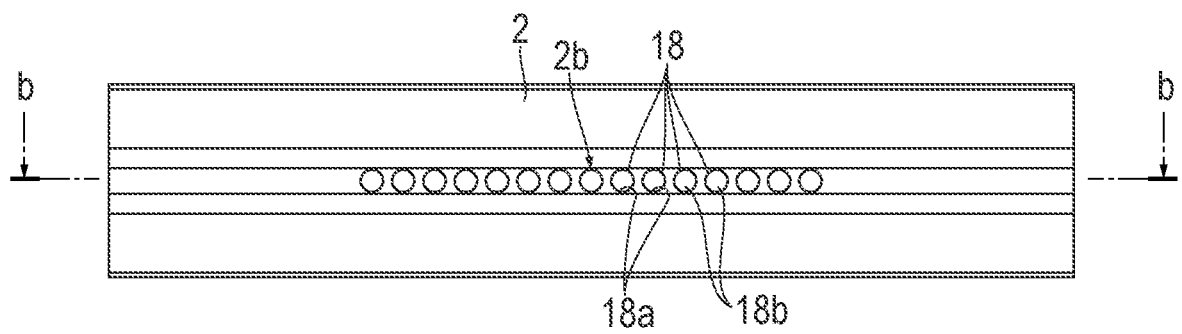
FIGS. 5A and 5B are detailed views (FIG. 5A is a front view, and FIG. 5B is a cross-sectional view taken along line b-b of FIG. 5A) of the guide rail of the linear motion guide apparatus of the embodiment.
Figure 5B:
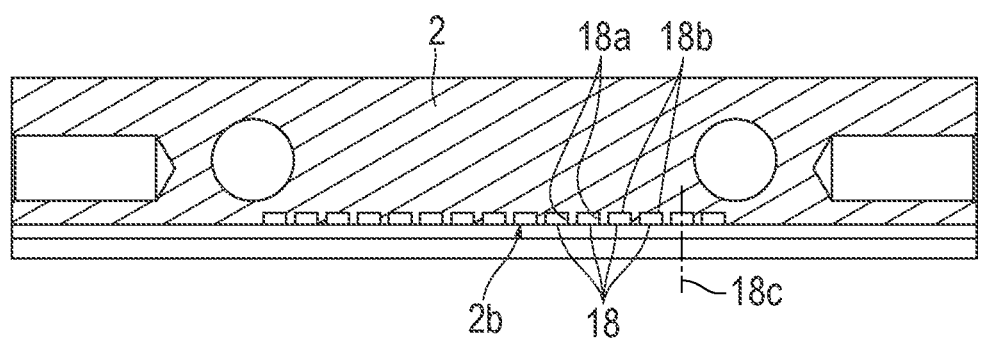

FIGS. 5A and 5B illustrate detailed views of the guide rail 2. The meshing portion 2b includes a plurality of circular holes 18 arranged in the longitudinal direction on the guide rail 2. The circular holes 18 are evenly spaced in the longitudinal direction on the guide rail 2. A wall surface 18a of each of the circular holes 18 is formed in a cylindrical shape. In other words, the shape of the circular holes 18 in cross section is circular, and the shape of the circular holes 18 in cross section is uniform in a depth direction thereof. A center line 18c of the each of the circular holes 18 is orthogonal to the longitudinal direction of the guide rail 2. As in the guide rail 2, a plurality of the circular holes 18 is also formed in the guide rail 3 (refer to FIG. 4).

The circular holes 18 are formed directly in the guide rails 2 and 3. Moreover, the circular holes 18 are drilled by use of, for example, a cutting tool such as a drill or end mill having a flat tip. Furthermore, for example, a bottom surface 18b of the each of the circular holes 18 is formed flat (refer to FIG. 5B). Note that the rack having the circular holes may be mounted on the guide rail, the circular holes may be drilled by, for example, electrical discharge machining, or the bottom surface of the circular hole may be formed in a conical shape adjusted to a drill having a conical tip.

Figure 6A:
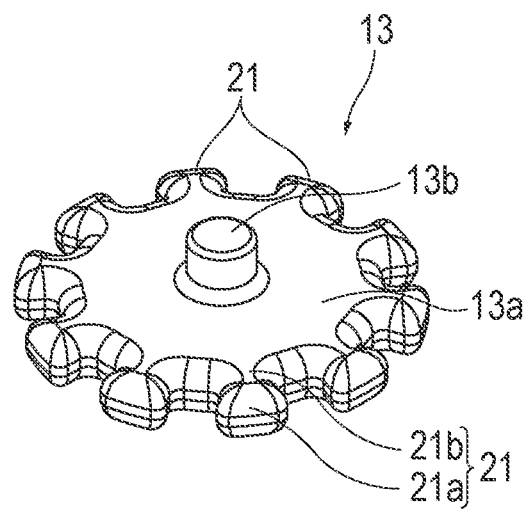
FIGS. 6A to 6C are detailed views (FIG. 6A is a perspective view, FIG. 6B is a side view, and FIG. 6C is a plan view) of the gear of the linear motion guide apparatus of the embodiment.
Figure 6B:
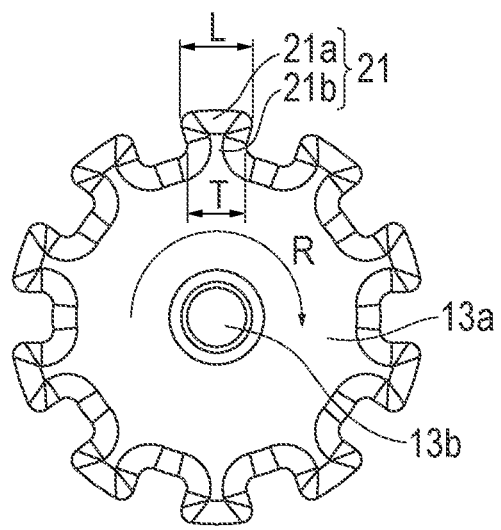
Figure 6C:
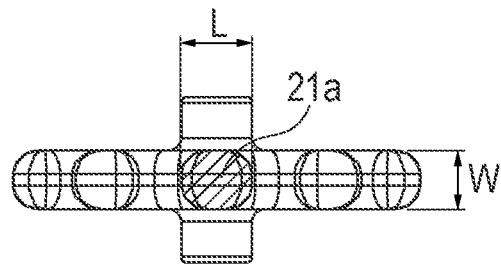

FIGS. 6A to 6C illustrate detailed views of the gear 13. As illustrated in FIG. 6A, the gear 13 includes a disk portion 13a having the many teeth 21 formed on the circumference, and a shaft portion 13b formed integrally with the disk portion 13a. The gear 13 is supported by the cage 10 in such a manner as to be rotatable about the shaft portion 13b.

Each of the teeth 21 of the gear 13 includes a tooth tip portion 21a and a dedendum portion 21b. The tooth tip portion 21a forms a shape obtained by rounding corners of a rectangular parallelepiped. As illustrated in FIGS. 6B and 6C, a length L of the tooth tip portion 21a in a rotational direction R is greater than a face width W (a length in a rotation axis direction) of the tooth tip portion 21a. Note that in FIG. 6C, the tooth tip portion 21a is hatched.

Figure 7A:
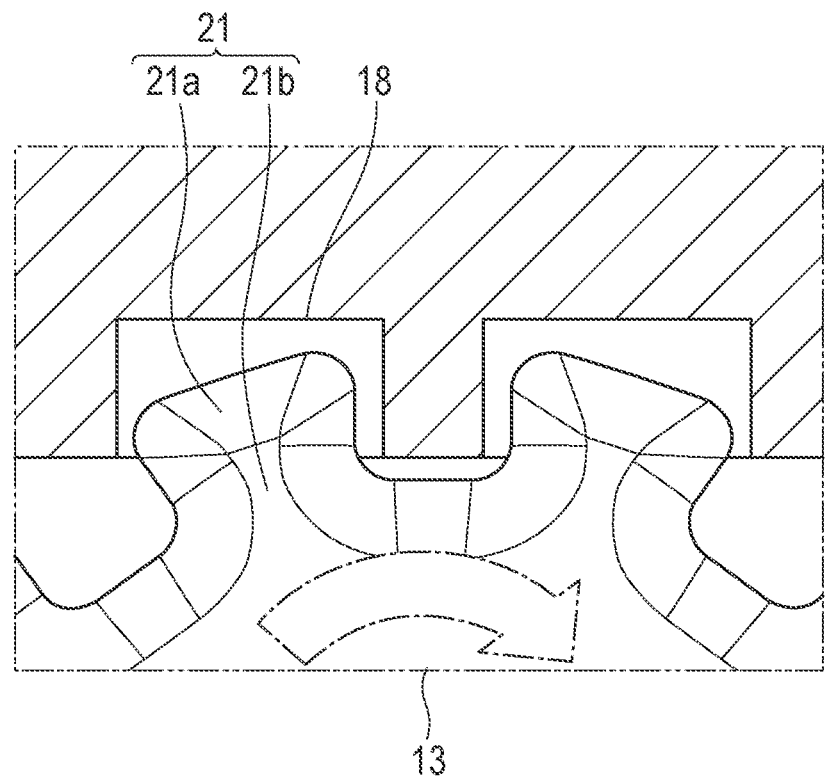
FIGS. 7A and 7B are diagrams illustrating circular holes and teeth of the gear of the linear motion guide apparatus of the embodiment (FIG. 7A illustrates a state in which the tooth of the gear starts to enter the circular hole, and FIG. 7B illustrates a state in which a tooth tip portion of the tooth is in contact with a wall surface of the circular hole).
Figure 7B:
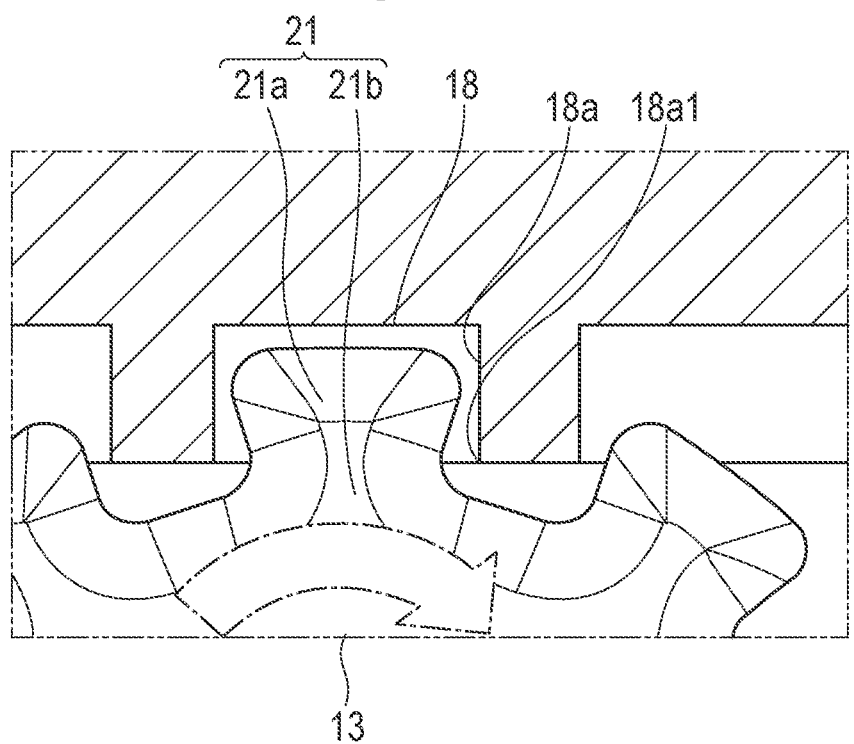

As illustrated in FIG. 6B, as viewed in the rotation axis direction, the dedendum portion 21b is constricted, and a length T of the dedendum portion 21b in the rotational direction R is less than the length L of the tooth tip portion 21a in the rotational direction R. FIGS. 7A and 7B illustrate the circular holes 18 and the teeth 21 of the gear 13. FIG. 7A illustrates a state in which the tooth 21 of the gear 13 starts to enter the circular hole 18, and FIG. 7B illustrates a state in which the tooth tip portion 21a is in contact with the wall surface 18a of the circular hole 18. Note that in FIG. 7B, it appears that there is a gap between the tooth tip portion 21a and the wall surface 18a of the circular hole 18. However, since the tooth tip portion 21a has the face width W in a direction into the page (a direction orthogonal to the page), the back side of the tooth tip portion 21a is in contact with the wall surface 18a of the circular hole 18 in the direction into the page. As illustrated in FIGS. 7A and 7B, the dedendum portion 21b of the tooth 21 is constricted in such a manner as to avoid interference with a mouth portion 18a1 of the circular hole 18.

Figure 8:
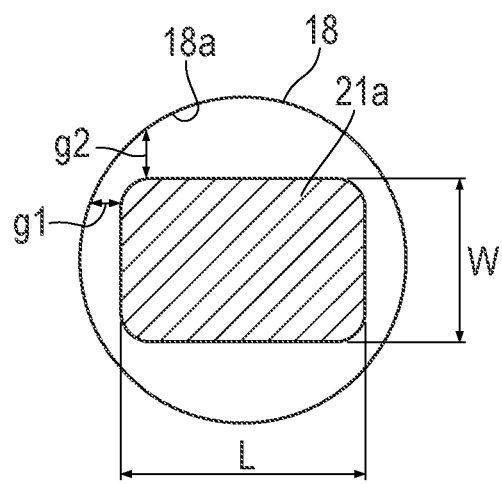
FIG. 8 is a cross-sectional view of the circular hole and the tooth tip portion of the linear motion guide apparatus of the embodiment.

FIG. 8 illustrates a cross-sectional view of the circular hole 18 and the tooth tip portion 21a (a cross-sectional view orthogonal to the axis of the circular hole 18). As described above, the length L of the tooth tip portion 21a in the rotational direction is greater than the face width W of the tooth tip portion 21a. Hence, a gap g1 in the rotational direction between the tooth tip portion 21a and the wall surface 18a of the circular hole 18 is smaller than a gap g2 in the rotation axis direction. The gap g2 is provided in such a manner as to permit axial runout of the gear 13 (the tilt of the gear 13).

When the length L of the tooth tip portion 21a in the rotational direction is greater than the face width W of the tooth tip portion 21a, then the gap g2 is larger than the gap g1. Hence, the cross-sectional area of the tooth tip portion 21a can be increased while permitting axial runout of the gear 13, and the strength of the tooth 21 can be increased. Moreover, the gap g1 is smaller than the gap g2. Therefore, it is possible to avoid the gear 13 from moving in the rotational direction (the longitudinal direction of the guide rails 2 and 3).

Figure 9:
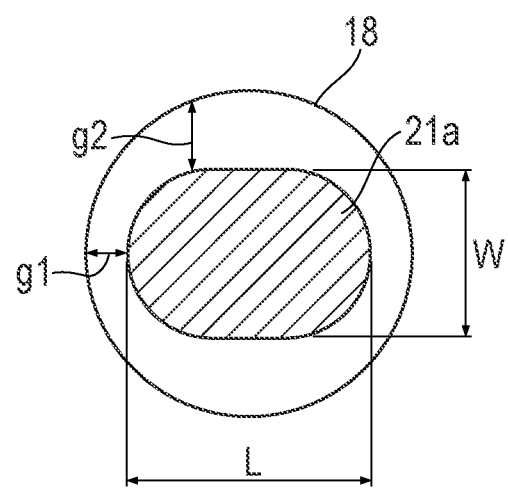
FIG. 9 is a cross-sectional view illustrating another example of the tooth tip portion.

FIG. 9 illustrates another example of the cross-sectional shape of the tooth tip portion 21a. As illustrated in FIG. 9, the cross-sectional shape of the tooth tip portion 21a may be a shape obtained by combining a rectangle and semicircles. Moreover, although not illustrated, the cross-sectional shape of the tooth tip portion 21a may be elliptical.

The configuration of the linear motion guide apparatus 1 of the embodiment is described above. The linear motion guide apparatus 1 of the embodiment has the following effects:

Each of the meshing portions 2b and 3b includes the plurality of circular holes 18 arranged in the longitudinal direction on the respective guide rail 2 or 3, and the wall surface 18a of the each of the circular holes 18 is formed in a cylindrical shape. Therefore, the shape of the meshing portions 2b and 3b that engage with the gear 13 can be simplified, and the meshing portions 2b and 3b can be easily provided to the guide rails 2 and 3.

The length L, in the rotational direction, of the tooth tip portion 21a of the each of the teeth 21 of the gear 13 is greater than the face width W of the tooth tip portion 21a. Therefore, the gap g2 can be made larger than the gap g1, and the cross-sectional area of the tooth tip portion 21a can be increased while permitting axial runout of the gear 13. Moreover, the gap g1 is smaller than the gap g2. Therefore, it is possible to avoid the gear 13 from moving in the rotational direction.

The dedendum portion 21b of the each of the teeth 21 is constricted as viewed in the rotation axis direction of the gear 13. Therefore, interference between the mouth portions 18a1 of the circular holes 18 and the teeth 21 can be avoided.

The circular holes 18 are formed directly in the guide rails 2 and 3. Therefore, the meshing portions 2b and 3b can be easily formed in the guide rails 2 and 3.

The bottom surfaces 18b of the circular holes 18 are formed flat. Therefore, it is possible to avoid interference between the circular holes 18 and the mounting holes 2a and 3a of the guide rails 2 and 3.

The circular holes 18 are drilled in the guide rails 2 and 3 with a cutting tool. Therefore, the circular holes 18 can be easily machined in the guide rails 2 and 3.

Note that the linear motion guide apparatus of the embodiment can be incorporated as an elementary component in a wide range of fields from industrial machine fields such as machine tools, semiconductor and liquid crystal manufacturing apparatuses (for example, mounters), and robots to consumer fields such as system kitchens, various game machines, medical machines, food machines, and conveyance apparatuses.

The present description is based on Japanese Patent Application No. 2021-012649 filed on Jan. 29, 2021. The entire contents thereof are included herein.

REFERENCE SIGNS LIST

1 Linear motion guide apparatus
2, 3 Guide rail
2b, 3b Meshing portion
9a, 9b Roller (rolling element)
10 Cage
13 Gear
18 Circular hole
18a Wall surface of circular hole
18b Bottom surface of circular hole
21 Tooth of gear
21a Tooth tip portion
21b Dedendum portion
L Length of tooth tip portion in rotational direction
W Face width of tooth tip portion

The invention claimed is:

1. A linear motion guide apparatus comprising:
two guide rails that are movable relative to each other in a longitudinal direction thereof via at least one rolling element; and
a cage configured to hold the rolling element and rotatably hold a gear engaging with a meshing portion provided to at least one of the two guide rails, wherein
the meshing portion includes a plurality of circular holes arranged in the longitudinal direction on the guide rail,
each of the circular holes has a wall surface formed in a cylindrical shape, and
a gap (g1) in a rotational direction of the gear between a tooth tip portion of each tooth of the gear and the wall surface of the circular hole is smaller than a gap (g2) in a rotation axis direction of the gear.

2. The linear motion guide apparatus according to claim 1, wherein the circular holes are formed directly in the guide rail.

3. The linear motion guide apparatus according to claim 1, wherein bottom surfaces of the circular holes are formed flat.

4. The linear motion guide apparatus according to claim 2, wherein bottom surfaces of the circular holes are formed flat.

5. A linear motion guide apparatus comprising:
two guide rails that are movable relative to each other in a longitudinal direction thereof via at least one rolling element; and
a cage configured to hold the rolling element and rotatably hold a gear engaging with a meshing portion provided to at least one of the two guide rails, wherein
the meshing portion includes a plurality of circular holes arranged in the longitudinal direction on the guide rail,
each of the circular holes has a wall surface formed in a cylindrical shape, and
a length, in a rotational direction, of a tooth tip portion of each tooth of the gear is greater than a face width of the tooth tip portion.

6. The linear motion guide apparatus according to claim 5, wherein the circular holes are formed directly in the guide rail.

7. The linear motion guide apparatus according to claim 6, wherein bottom surfaces of the circular holes are formed flat.

8. The linear motion guide apparatus according to claim 5, wherein bottom surfaces of the circular holes are formed flat.

9. A linear motion guide apparatus comprising:
two guide rails that are movable relative to each other in a longitudinal direction thereof via at least one rolling element; and
a cage configured to hold the rolling element and rotatably hold a gear engaging with a meshing portion provided to at least one of the two guide rails, wherein
the meshing portion includes a plurality of circular holes arranged in the longitudinal direction on the guide rail,
each of the circular holes has a wall surface formed in a cylindrical shape, and
a dedendum portion of each tooth of the gear is constricted as viewed in a rotation axis direction of the gear.

10. The linear motion guide apparatus according to claim 9, wherein the circular holes are formed directly in the guide rail.

11. The linear motion guide apparatus according to claim 10, wherein bottom surfaces of the circular holes are formed flat.

12. The linear motion guide apparatus according to claim 9, wherein bottom surfaces of the circular holes are formed flat.

* * * * *